(12) United States Patent
Leistner et al.

(10) Patent No.: US 10,221,301 B2
(45) Date of Patent: Mar. 5, 2019

(54) FLAME RETARDANT COMPOSITION

(71) Applicant: J.M. Huber Corporation, Atlanta, GA (US)

(72) Inventors: Marcus Leistner, Groβ-Zimmern (DE); Rudolf Pfaendner, Rimbach (DE); Trupti Dave, Zwingenberg (DE); Hans-Günter Köstler, Heppenheim (DE); Wolfgang Wehner, Zwingenberg (DE); Yann Bourgeois, Petit-Roeulx-lez-Nivelles (BE)

(73) Assignee: J.M. Huber Corporation, Atlanta, GA (US)

( * ) Notice: Subject to any disclaimer, the term of this patent is extended or adjusted under 35 U.S.C. 154(b) by 389 days.

(21) Appl. No.: 14/767,224

(22) PCT Filed: Feb. 12, 2014

(86) PCT No.: PCT/EP2014/052758
§ 371 (c)(1),
(2) Date: Aug. 11, 2015

(87) PCT Pub. No.: WO2014/124990
PCT Pub. Date: Aug. 21, 2014

(65) Prior Publication Data
US 2015/0376375 A1 Dec. 31, 2015

(30) Foreign Application Priority Data

Feb. 13, 2013 (DE) .................. 10 2013 202 351
Jun. 11, 2013 (DE) .................. 10 2013 210 902

(51) Int. Cl.
| | |
|---|---|
| *C08K 5/5313* | (2006.01) |
| *C09K 21/12* | (2006.01) |
| *C08K 5/098* | (2006.01) |
| *C08K 5/20* | (2006.01) |
| *C08K 5/526* | (2006.01) |
| *C08K 7/14* | (2006.01) |
| *C08L 77/06* | (2006.01) |
| *C08K 5/00* | (2006.01) |
| *C09K 21/04* | (2006.01) |
| *C08L 77/00* | (2006.01) |
| *C08K 5/3492* | (2006.01) |

(52) U.S. Cl.
CPC .......... *C08K 5/5313* (2013.01); *C08K 5/0091* (2013.01); *C08K 5/098* (2013.01); *C08K 5/20* (2013.01); *C08K 5/34928* (2013.01); *C08K 5/526* (2013.01); *C08K 7/14* (2013.01); *C08L 77/00* (2013.01); *C08L 77/06* (2013.01); *C09K 21/04* (2013.01); *C09K 21/12* (2013.01)

(58) Field of Classification Search
CPC ..................................... C08K 5/5313
USPC ........................................ 524/100
See application file for complete search history.

(56) References Cited

U.S. PATENT DOCUMENTS 8,444,884 B2    5/2013  Futterer et al.
2014/0361230 A1* 12/2014 Kostler ............ C07D 251/54
                                      252/607

FOREIGN PATENT DOCUMENTS

| DE | 10 2004 049 614 | * | 4/2006 |
| DE | 201010035103 A1 | | 2/2012 |
| EP | 1657972 A1 | | 5/2006 |
| WO | 2010/057851 A1 | | 5/2010 |
| WO | WO 2012/025362 | * | 3/2012 |

OTHER PUBLICATIONS

Machine translation of DE 10 2004 049 614 (Year: 2006).*
Search Report and Written Opinion for International Application No. PCT/EP2014/052758, dated Feb. 12, 2014 (7 pages).
Chinese Office Action issued in Application No. 201480022018X, dated Nov. 11, 2016 (7 pages).

* cited by examiner

*Primary Examiner* — Doris L Lee
(74) *Attorney, Agent, or Firm* — Eversheds Sutherland (US) LLP

(57) ABSTRACT

The invention relates to flame retardants for plastics such as, for example, synthetic polymers and plastic compositions, as well as corresponding production methods and uses.

19 Claims, No Drawings

FLAME RETARDANT COMPOSITION

CROSS REFERENCE TO RELATED APPLICATIONS

This application is a U.S. national stage application of PCT/EP2014/052758, filed on Feb. 12, 2014, which claims priority to German Application No. 10 2013 202 351.0, filed on Feb. 13, 2013, and German Application No. 10 2013 210 902.4, filed Jun. 11, 2013. The contents of these applications are hereby incorporated by reference.

The invention relates to flame retardants for plastics such as, for example, synthetic polymers and plastic compositions, as well as corresponding production methods and uses.

BACKGROUND OF THE INVENTION

Most plastics are combustible and comparatively highly flammable. To reduce or preclude the risk of plastics burning in particular applications, it is therefore required to lower the flammability and/or to deploy flame-proof plastic compositions. For this purpose, flame retardants are usually added to the plastic with the aim of preventing igniting for a certain time or to significantly delay the spread of fire. Traditional flame retardants are based on chlorine- and bromine-containing compounds (frequently in combination with antimony trioxide), of phosphoric and nitrogenous compounds and of inorganic hydroxides. More recently, for environmental reasons, halogen-free fire proofing solutions are preferred.

EP 1 657 972 B1 relates to phosphinate complex compounds of the 2nd, 3rd, 12th and 13th groups and their use as flame retardants. In particular, phosphinate complexes of the formula

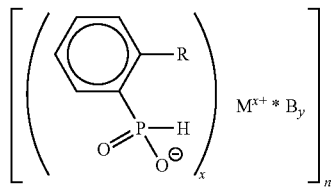

are described, in which M is one of the metals of the second, third, twelfth or thirteenth group of the periodic system of the elements;

x denotes the number 2 or 3;

R denotes a hydrogen atom or a 2 hydroxyphenyl residue;

B denotes a Lewis base;

y denotes the number 1 or 2; and n denotes an integer from 1 to 100.

EP 2 183 314 B1 relates to phosphoric triazine compounds as fire retardants. In particular, compounds of the formula $[(A-H)^+]_m [M^{m+}(HPO_4^{2-})_m]$ and the formula $[(A-H)^+]_m [M^{m+}(P_2O_7^{4-})_{m/2}]$ are disclosed, wherein $(A-H)^+$ is a residue of the formula

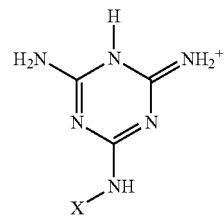

and wherein X is H, CN, C(NH)NH$_2$, C(O)NH$_2$, C(NH)NHCN or its condensation product, wherein M is, independently of one another, Ca, Mg, Zn or Al and wherein m is 2 or 3.

A flame retardant composition is known from WO 2012/025362 which has at least one triazine-intercalated metal phosphate of the formula

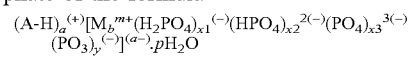

and comprises at least one additional flame retardant component. Here, each M is independently Cu, Mg, Ca, Zn, Mn, Fe, Co, Ni, TiO, ZrO, VO, B, Si, Al, Sb, La, Ti, Zr, Ce or Sn. The additional flame retardant component can be a metal phosphinate of the formula

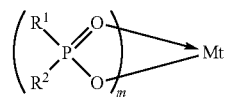

wherein R$^1$ and R$^2$ is hydrogen or a straight-chain or a branched C$_1$-C$_6$ alkyl residue or a phenyl residue and Mt=Ca, Mg, Zn or Al and m=2 or 3.

SUMMARY OF THE INVENTION

Although various flame retardants such as the examples specified above are known, there is still a need for flame retardants which are able to be processed well with the respective plastics and which are effective in comparatively low concentrations and are furthermore cost-effective.

This requirement is met by the subject-matters of the independent claims. Advantageous embodiments of the present invention are described in the dependent claims.

According to an embodiment of a first aspect of the subject-matters disclosed herein, a flame retardant composition is provided, containing a compound of Formula I:

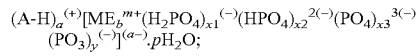

and a derivative (for example a salt) of 9,10-dihydro-9-oxa-10-phosphorylphenanthrene-10-oxide or polymeric complexes of this derivative, according to at least one of the Formulae IIa, IIb, IIc and IId:

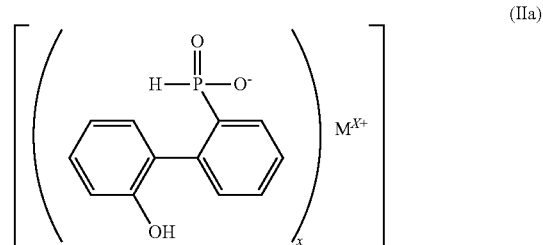

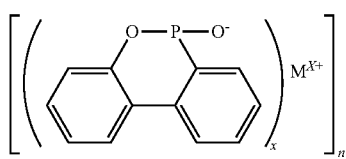
(IIb)

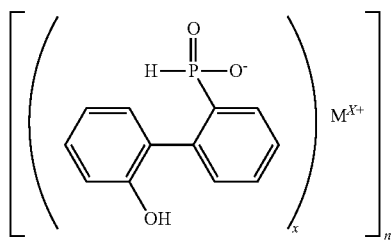
(IIc)

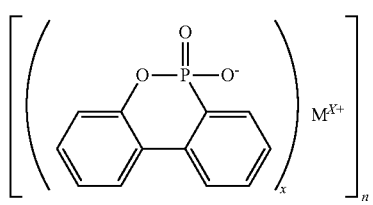
(IId)

wherein each ME is independently one of Cu, Mg, Ca, Zn, Mn, Fe, Co, Ni, TiO, ZrO, VO, B, Si, Al, Sb, La, Ti, Zr, Ce or Sn and each M is independently one of a metal of the second, third, twelfth or thirteenth group of the periodic system;
wherein x=2 or 3; and wherein n≥1;
wherein $(A-H)^{(+)}$ is a residue of Formula III;

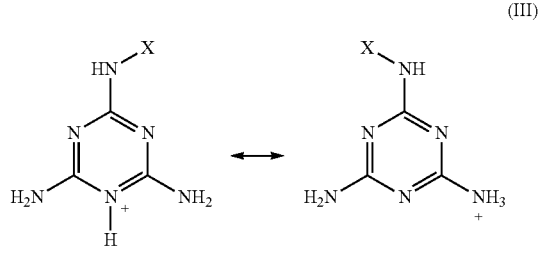
(III)

wherein X is one of H, CN, C(NH)NH$_2$, C(O)NH$_2$, C(NH)NHCN, or a condensation product of one or more of H, CN, C(NH)NH$_2$, C(O)NH$_2$, C(NH)NHCN; wherein m is an integer in the interval [1, 4]; wherein a is an integer in the interval [1, 6]; wherein b is an integer in the interval [1, 14]; wherein each of x1, x2, x3, y is an integer in the interval [0, 12], wherein at least one of x1, x2, x3, y is greater than zero (>0); wherein p is an integer in the interval [0, 5]; and wherein the following applies: a+m b=x1+2 x2+3 x3+y. Here, ME is the metal connected with the compound of Formula I and M is the metal connected with one of the formulae IIa, IIb, IIc and IId.

The derivative of 9,10-dihydro-9-oxa-10-phosphoryl-phenanthrene-10-oxide (hereafter referred to as "derivative") or the polymeric complexes of the derivative can be present in oxidised form (Formula IIb, IId) and/or hydrated form (Formula IIa, IIc). The oxidised form is in equilibrium here with the corresponding hydrated form. In particular, Formula IIa is in equilibrium with Formula IIb and Formula IIc is in equilibrium with Formula IId. Depending on the present conditions and the previous history (e.g. the production conditions), the equilibrium can be shifted towards the oxidised form or towards the hydrated form, wherein in an extreme case the flame retardant composition can contain exclusively the oxidised form or exclusively the hydrated form.

According to a further embodiment of the first aspect, a flame retardant composition is provided, the flame retardant composition containing a compound of Formula I:

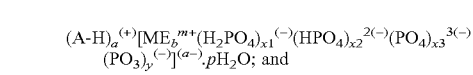

a salt of 9,10-dihydro-9-oxa-10-phosphorylphenanthrene-10-oxide or polymeric complexes of this salt, according to Formula IIa;

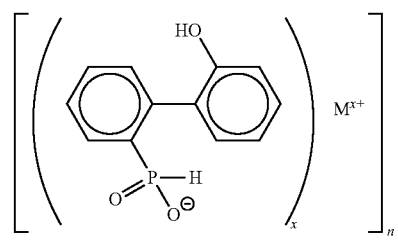
(IIa)

wherein each ME is independently one of Cu, Mg, Ca, Zn, Mn, Fe, Co, Ni, TiO, ZrO, VO, B, Si, Al, Sb, La, Ti, Zr, Ce or Sn and each M is independently one of a metal of the second, third, twelfth or thirteenth group of the periodic system;
wherein x=2 or 3;
wherein n≥1;
wherein $(A-H)^{(+)}$ is a residue of Formula III;

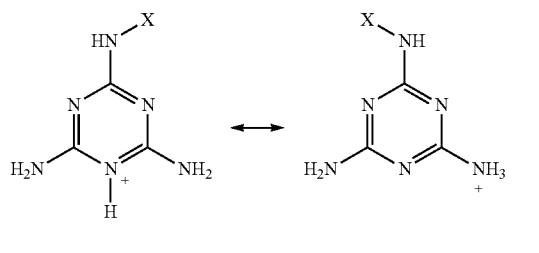
(III)

wherein X is one of H, CN, C(NH)NH$_2$, C(O)NH$_2$, C(NH)NHCN, or a condensation product of one or more of H, CN, C(NH)NH$_2$, C(O)NH$_2$, C(NH)NHCN;
wherein m is an integer in the interval [1, 4];
wherein a is an integer in the interval [1, 6];
wherein b is an integer in the interval [1, 14];
wherein each of x1, x2, x3, y is an integer in the interval [0, 12],
wherein at least one of x1, x2, x3, y is >0;
wherein p is an integer in the interval [0, 5]; and
wherein the following applies: a+m b=x1+2 x2+3 x3+y.

According to an embodiment, the derivative contained in the flame retardant composition (or the polymeric complexes of the derivative) is exclusively a derivative or a polymeric complex of the derivative according to Formula IIa/IIb. According to another embodiment, the derivative contained in the flame retardant composition (or the polymeric complexes of the derivative) is exclusively a derivative or a polymeric complex of the derivative according to Formula IIc/IId. According to yet another embodiment, the derivative of 9,10-dihydro-9-oxa-10-phosphorylphenanthrene-10-oxide contained in the flame retardant composition (or the polymeric complexes of the derivative) is formed both from a derivative or polymeric complex of the derivative according to Formula IIa/IIb and from a derivative or polymeric complex of the derivative according to Formula IIc/IId. The abbreviation "according to Formula IIx/IIy" (wherein x and y are selected from a, b, c, and d) here means "according to Formula IIx and/or IIy", in particular "with a derivative component according to Formula IIx and/or a derivative component according to Formula IIy". For example, a derivative or polymeric complex according to Formula IIa/IIb is a derivative of 9,10-dihydro-9-oxa-10-phosphorylphenanthrene-10-oxide with a derivative component according to Formula IIa and/or a derivative component according to Formula IIb.

According to an embodiment, the derivative contained in the flame retardant composition (or the polymeric complexes of the derivative) contains a derivative or a polymeric complex of the derivative according to Formula IIa/IIb. According to an embodiment, the derivative contained in the flame retardant composition (or the polymeric complexes of the derivative) contains a derivative or a polymeric complex of the derivative according to Formula IIc/IId.

The first aspect of the subject-matters disclosed herein is based on the inventors' realisation that the compound according to Formula I in combination with the derivative of 9,10-dihydro-9-oxa-10-phosphorylphenanthrene-10-oxide or its polymeric complexes obtains a synergistic effect and the effectiveness of the flame retardant composition is higher than expected.

It is furthermore known that flame retardants based on phosphorus compounds frequently cause corrosion of (common) processing machines such as extruders or injection moulding machines. In contrast, embodiments of the subject-matters disclosed herein distinguish themselves through low corrosion of processing machines. In other words, in embodiments of the subject-matters disclosed herein, no or only low amounts of additives are required in order to avoid corrosion of processing machines.

In order to lower costs, there is generally an effort to keep the number of different flame retardants as low as possible, for example to lower storage costs. However, this disadvantage is offset by the synergistic effect of the claimed combination of flame retardants, so that the deployment of the claimed flame retardant composition overall can be advantageous.

Furthermore, a synergistic flame retardant composition permits low use concentrations of the flame retardant composition, which facilitates incorporation into the plastic and in comparison to higher concentrations can lead to advantageous characteristics, such as e.g. mechanical characteristics during use.

According to an embodiment, precisely one or two of x1, x2, x3 and y are greater than zero (>0). For example, according to this embodiment, precisely two of x1, x2, x3 and y are greater than zero (>0), i.e. in the interval [1, 12]. According to an embodiment, Formula I is a compound of Formula IV, wherein Formula IV is $[(A-H)^+]_a [ME_b^{m+}(HPO_4^-)_x(HPO_4^{2-})_y]$ and $a+b*m=x+2*y$. According to a further embodiment, Formula I is a compound of Formula V, wherein Formula V is $[(A-H)^+]_a [ME_b^{m+}(PO_4^{3-})_x(PO_3^-)_y]$ and $a+b*m=3*x+y$.

According to an embodiment, precisely one of x1, x2, x3 and y is greater than zero (>0). In other words, according to this embodiment, only a single one of x1, x2, x3 and y is greater than zero, i.e. in the interval [1, 12]. According to an embodiment, Formula I is a compound of Formula IV, wherein Formula IV is $[(A-H)^+]_a [ME_b^{m+}(HPO_4^{2-})_m]$. According to a further embodiment, Formula I is a compound of Formula V, wherein Formula V is $[(A-H)^+]_a [ME_b^{m+}(P_2O_7^{4-})_{m/2}]$.

According to a further embodiment, it is possible that a=m, in particular in compounds of the Formulae IV and V. Additionally or alternatively to this, according to an embodiment it is possible that b=1. For example, according to an embodiment, Formula IV can be $[(A-H)^+]_m [ME^{m+}(HPO_4^{2-})_m]$. According to a further embodiment, Formula V is $[(A-H)^+]_m[ME^{m+}(P_2O_7^{4-})_{m/2}]$. According to an embodiment, m=2 or m=3.

According to an embodiment, $(A-H)^+$ is a melamine of Formula III-1:

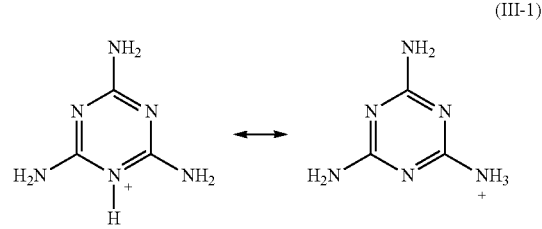

(III-1)

According to an embodiment, each ME in Formula I, IV or V is independently one of Cu, Mg, Ca, Zn, Mn, Fe, Co, Ni, TiO, ZrO, VO, B, Si, Al, Sb, La, Ti, Zr, Ce or Sn. If at least two MEs are contained in Formulae I, IV or V, two or more of the MEs, for example, can be different from one another. According to another embodiment, all MEs can be the same. According to an embodiment, each M in Formulae IIa, IIb, IIc and IId is independently one of a metal of the second, third, twelfth or thirteenth group of the periodic system. According to a further embodiment, each M in Formulae IIa and IIc is independently one of a metal of the second, third, twelfth or thirteenth group of the periodic system. If at least two Ms are present in one of the Formulae IIa, IIb, IIc or IId, two or more of the Ms, for example, can be different from one another. According to another embodiment, all Ms can be the same in a single formula of the Formulae IIa, IIb, IIc or IId. Furthermore, the Ms can be different in two different formulae of the Formulae IIa, IIb, IIc and IId. According to another embodiment, all Ms can be the same in the formulae IIa, IIb, IIc and IId.

According to an embodiment and in particular together the embodiment in which $(A-H)^+$ is a melamine of Formula III-1, ME in the Formulae I, IV and V is, independently of one another, Al, Mg or Zn. According to an embodiment, in the flame retardant composition ME is always one of Ca, Mg, Zn or Al.

According to an embodiment, the compound of Formula V contains melamine (aluminium phosphate) $(Mel-H_2)_2^{(+)} [AlP_3O_{10}]^{2(-)}$ or consists thereof. This flame retardant can for example be produced according to DE102007036465A1.

According to a further embodiment, the compound of Formula V contains melamine (zinc phosphate) $[(Mel-H)^+]_2 [ZnP_2O_7]^{2-}$ or consists thereof.

According to a further embodiment, the compound of Formula V contains melamine (magnesium phosphate) of the general formula $(Mel-H)_x^+ [Mg^{2+}]_2 [PO_3^-]_{(x+1)}[PO_4^{3-}]$, wherein x is between 1 and 4, or consists thereof. For example, according to a further embodiment, the compound of Formula V contains (for x=2) melamine (magnesium phosphate) of the formula $(Mel\text{-}H)_2^{(+)} [Mg_2P_4O_{13}]^{2(-)}$ or consists thereof.

By heating the compounds melamine (aluminium phosphate), melamine (zinc phosphate) and melamine (magnesium phosphate) to temperatures above 240° C., the formation of oligomeric and polymeric pyrophosphato metallates takes place. For example, the processing of the compound according to Formula I, for example of the compound according to Formula IV or V, can take place according to the disclosure of EP 2 183 314 B1 and/or WO 2012/025362 A1.

Generally, the disclosure of WO 2012/025362 A1 and EP 2 183 314 B1 is included here by reference.

According to an embodiment, the compounds disclosed herein according to Formula I, IV or V, for example the melamine (aluminium phosphate), melamine (zinc phosphate) and melamine (magnesium phosphate) compounds or the oligomers or polymers thereof, are synthesised according to one of the methods set out by DE 102007036465 A1.

According to a further embodiment, $(A\text{-}H)^{(+)}$ is a melam of Formula III-2:

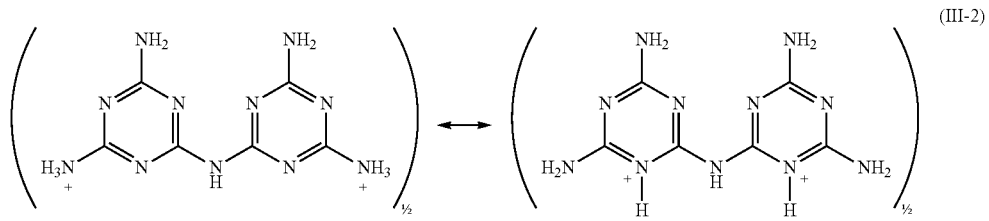

(III-2)

According to yet another embodiment, $(A\text{-}H)^{(+)}$ is a melem of Formula III-3:

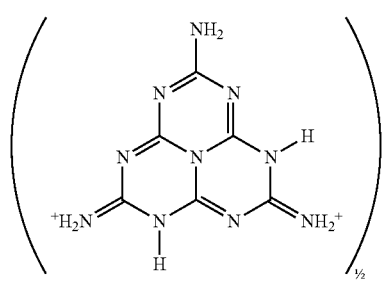

(III-3)

According to an embodiment, the metal in the derivative of 9,10-dihydro-9-oxa-10-phosphorylphenanthrene-10-oxide is Zn, Mg or Al. According to a preferred embodiment, the metal in the derivative of 9,10-dihydro-9-oxa-10-phosphorylphenanthrene-10-oxide is Zn.

According to an embodiment, the derivative of 9,10-dihydro-9-oxa-10-phosphorylphenanthrene-10-oxide, which is also known under the abbreviation "DOPO", is bis(2'-hydroxybiphenyl-2-phosphinato)-zinc according to Formula VII (Zn-DOPO).

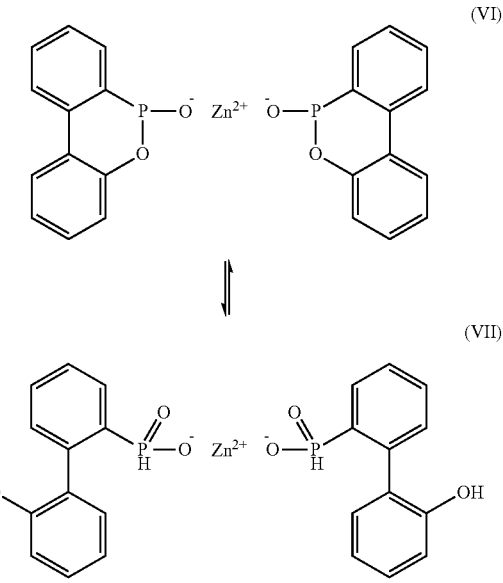

The Zn-DOPO of Formula VII is in equilibrium here with the compound according to Formula VI and changes into this compound with release of water. Clearly the Zn-DOPO of Formula VI is based on Formula IIb and the Zn-DOPO of Formula VII is based on Formula IIa. Similarly, according to another embodiment, the derivative of 9,10-dihydro-9-oxa-10-phosphorylphenanthrene-10-oxide or its polymeric complexes is a Zn-DOPO based on Formula IIc and Formula IId. According to a further embodiment, the derivative of 9,10-dihydro-9-oxa-10-phosphorylphenanthrene-10-oxide or its polymeric complexes is a Zn-DOPO based on Formulae IIa, IIb, IIc and IId, wherein as explained above in each case the oxidised form is in equilibrium with the hydrated form.

According to a further embodiment, the flame retardant composition contains at least one additional flame retardant which is different from the compound of Formula IV or Formula V and which is different from the derivative of 9,10-dihydro-9-oxa-10-phosphorylphenanthrene-10-oxide or its polymeric complex. According to an embodiment, at least one of the at least one additional flame retardant is an inorganic flame retardant, a nitrogenous flame retardant, a phosphoric flame retardant, a chlorine- and/or bromine-containing compound, a borate, or an antidrip agent.

Inorganic flame retardants can be for example $Al(OH)_3$, $Mg(OH)_2$, $AlO(OH)$, zinc stannate, zinc hydroxystannate, hydrotalcite, layer silicates, such as montmorillonite, non-modified or organically modified, double salts, such as e.g. Mg—Al silicates or POSS (Polyhedral Oligomer Silsesquioxane) compounds, or can contain such compounds.

Nitrogenous flame retardants can be for example melamine, melem, melam, melon, melamine derivatives, melamine condensation products or melamine salts, benzoguanamine, polyisocyanurates, allantoin, phosphacenes in particular melamine cyanurate, melamine phosphate, melamine pyrophosphate, dimelamine phosphate, melamine polyphosphate, ammonium polyphosphate, melamine borate, melamine hydrobromide, ethylenediamine orthophosphate, piperazine polyphosphate, piperazine pyrophosphate, piperazine orthophosphate or can contain such compounds.

Phosphoric flame retardants can be for example red phosphorus, phosphates such as e.g. resorcinol diphosphate, bisphenol A diphosphate and oligomers thereof, triphenyl phosphate, phosphinates such as e.g. salts of hypophosphorous acid and its derivatives such as diethyl aluminium phosphinate, diethyl zinc phosphinate or aluminium phosphinate, phosphonate esters, oligomeric and polymeric derivatives of methane phosphonic acid, 9,10-dihydro-9-oxa-10-phosphorylphenanthrene-10-oxide (DOPO) and substituted compounds or can contain such compounds.

A flame retardant in the form of a chlorine- and/or bromine-containing compound is or contains e.g. one or more of the following compounds: polybrominated diphenyl oxides, tris(3-bromo-2,2-bis(bromomethyl)propyl phosphate, ethylene bis(tetrabromophthalimide), tetrabromobisphenol A, brominated polystyrene, brominated polybutadiene or block copolymers consisting of polystyrene and brominated polybutadiene.

A flame retardant in the form of a borate is or contains e.g. zinc borate or calcium borate.

A flame retardant in the form of an antidrip agent is or contains e.g. polytetrafluoroethylene.

According to an embodiment of a second aspect of the subject-matters disclosed herein, a plastic composition is provided which contains a plastic and a flame retardant composition according to one or more of the embodiments disclosed herein, in particular according to one or more embodiments of the first aspect, wherein the plastic is a thermoplastic plastic, an elastomeric plastic or a thermosetting plastic.

For example, the plastic composition according to an embodiment contains a plastic component which comprises at least one plastic, wherein of the at least one plastic at least one plastic is a thermoplastic plastic, an elastomeric plastic or a thermosetting plastic. According to an embodiment, each plastic of the plastic composition is a thermoplastic plastic, an elastomeric plastic or a thermosetting plastic. According to an embodiment, the plastic composition contains the plastic component and the flame retardant composition and, optionally, an additional component, for example an additional component disclosed herein. According to an embodiment, the plastic composition consists of the plastic component and the flame retardant composition and, optionally, an additional component disclosed herein.

According to an embodiment, the plastic is a material which contains macromolecules with organic groups, for example a synthetic polymer. Suitable polymers are in particular:

a) polymers of olefins or diolefins such as e.g. polyethylene (LDPE, LLDPE, VLDPE, MDPE, HDPE), polypropylene, polyisobutylene, poly-4-methylpentene-1, polybutadiene, polyisoprene, polycyclooctene, as well as copolymers in the form of statistical or block structures such as e.g. polypropylene-polyethylene (EP), EPM or EPDM, ethylene-vinyl acetate (EVA), ethylene-acrylic ester.

b) polystyrene, polymethylstyrene, styrene-butadiene-styrene (SBS), styrene-isoprene, styrene-butadiene-acrylonitrile (ABS), styrene-acrylonitrile-acrylate (ASA), styrene-maleic anhydride polymers including suitable graft copolymers such as e.g. styrene on butadiene or maleic anhydride on SBS.

c) halogen-containing polymers such as polyvinyl chloride and polyvinylidene chloride, for example.

d) polymers of unsaturated esters such as polyacrylates and polymethacrylates, for example, such as PMMA and polyacrylonitrile.

e) polymers from unsaturated alcohols and derivatives, such as polyvinyl alcohol, polyvinyl acetate, polyvinyl butyral, for example.

f) polyacetals, such as polyoxymethylene, for example.

g) polyphenylene oxides and blends with polystyrene.

h) polyurethanes, in particular linear polyurethanes.

i) polyamides such as polyamide-6, 6.6, 6.10. 4.6, 6.12, 12.12, polyamide 11, polyamide 12 for example, as well as (partially) aromatic polyamides such as polyphthalamides, for example.

j) polyimides, polyamide-imides, polyetherimides, polyketones, polysulfones, polyether sulfones, polyphenylene sulfide.

k) polyesters such as, for example, polyethylene terephthalate and polybutylene terephthalate, polylactic acid.

l) polycarbonate.

m) cellulose derivatives, such as cellulose nitrate, cellulose acetate, cellulose propionate, for example.

n) as well as mixtures, combinations or blends of two or more of the previously specified polymers.

According to an embodiment, the plastic contains or the plastic consists of at least one of the following compounds: polyamide, copolyamide, for example produced from diamines and dicarboxylic acids and/or from aminocarboxylic acids or the corresponding lactams such as, for example, polyamide 4, polyamide 6, polyamide 6.6, polyamide 6.10, polyamide 6.9, polyamide 6.12, polyamide 4.6, polyamide 4.10, polyamide 12.12, polyamide 11, polyamide 12, (partially) aromatic polyamide in particular produced from hexamethylene diamine and isophthalic acid and/or terephthalic acid, polyamide or copolyamide blends with ABS.

According to a preferred embodiment, the plastic composition contains polyamide 6.6, polyamide 6.10, polyamide 4.6 and/or (partially) aromatic polyamides, with polyamide 6.6 and (partially) aromatic polyamides being very particularly preferred. Of course, the term "(partially) aromatic polyamides" Includes both aromatic polyamides and also partially aromatic polyamides.

According to an embodiment, the plastic composition further contains a reinforcing material and/or a filler material, for example glass fibres.

According to a further embodiment, the plastic composition further contains one or more acid scavengers, one or more stabilisers and/or one or more dispersing agents.

According to an embodiment, the plastic composition contains (or the plastic composition consists of) a basic component consisting of:

(A) 40-95 wt % of at least one plastic, for example polyamide (B) 1-30 wt % of phosphoric triazine compounds according to Formula I, for example according to Formula IV or Formula V (C) 1-30 wt % of the derivative of 9,10-dihydro-9-oxa-10-phosphorylphenanthrene-10-oxide or its polymeric complex (D) 0-20 wt % additional flame retardant (one or more flame retardants, which are different from (B) and (C))

(E) 0-40 wt % reinforcing material and/or filler material so that the ingredients (A) to (E) in total add up to 100 wt %.

A preferred embodiment comprises (A) 40-95 wt % of at least one plastic, for example polyamide (B) 2-20 wt % of phosphoric triazine compounds according to Formula I, for example according to Formula IV or Formula V (C) 2-20 wt % of the derivative of 9,10-dihydro-9-oxa-10-phosphorylphenanthrene-10-oxide or its polymeric complex (D) 0-20 wt % additional flame retardant (one or more flame retardants, which are different from (B) and (C))

(E) 0-40 wt % reinforcing material and/or filler material so that the ingredients (A) to (E) in total add up to 100 wt %.

Unless otherwise specified, the percent values specified herein are weight percent (wt %).

According to an embodiment, the weight ratio between the compound of Formula I and the derivative of 9,10-dihydro-9-oxa-10-phosphorylphenanthrene-10-oxide or its polymeric complexes is between 1:30 and 30:1 or, according to another embodiment, between 1:10 and 10:1, as is for example also the case in the above-specified embodiments of plastic compositions.

Reinforcing and/or filler material comprises at least one filler material, such as for example calcium carbonate, talcum, wollastonite, dolomite and/or at least one reinforcing material, such as for example glass fibres and/or carbon fibres. Glass fibres are preferred.

According to an embodiment, the 40-95 wt % of at least one plastic are for example 40-95 wt % of a plastic component as described above.

For example, the plastic composition exclusively consists of the basic component. According to a further embodiment, the plastic composition contains, alongside the basic component, at least one additional component, for example one or more of the additives specified below.

According to a further embodiment, the plastic composition can contain alongside the basic component additional additives, for example from the group of UV absorbers, light stabilisers, stabilisers, hydroxylamines, benzofuranones, nucleating agents, impact modifiers, plasticisers, lubricants, rheology modifiers, processing agents, pigments, colouring agents, optical brighteners, antimicrobial active agents, antistatics, slip agents, anti-blocking agents, coupling agents, compatibilisers, dispersing agents, oxygen scavengers, acid scavengers, marking agents or antifogging agents. In a preferred embodiment, the plastic composition contains alongside the basic component in particular acid scavengers, e.g. based on salts of long-chain acids such as e.g. calcium stearate or zinc stearate or on hydrotalcites and/or stabilisers from the group of the phenolic antioxidants and of the phosphites or as polyamide stabilisers metals such as Cu or Fe and their halogenated salts.

In a preferred embodiment, the plastic composition additionally contains a polymer-based dispersing agent. A suitable polymeric dispersing agent consists of a polymer chain and of anchor groups. The polymer chain produces the compatibility with the plastic which is to be made flame-retardant and the anchor groups have an interaction with the flame retardant. Suitable polymeric dispersing agents are for example styrene-maleic anhydride copolymers, aliphatic polyethers with carboxyl end groups and (meth)acrylate copolymers with (meth)acrylic acid groups or methacrylate ionomers.

The preferred additional additives from the class of the acid scavengers, the stabilisers and the dispersing agent are preferably added in concentrations between 0.05 wt % and 3 wt % relative to the weight of the plastic composition.

Of course, when additional additives are added, the ratio of the components (A) to (E) to one another does not change in the plastic composition's basic component defined according to (A) to (E).

According to a third aspect of the subject-matters disclosed herein, a use of a flame retardant composition according to one or more of the embodiments disclosed herein as a flame retardant for a plastic is supplied.

According to a fourth aspect of the subject-matters disclosed herein, a method is provided for producing a plastic composition which comprises at least one plastic and a flame retardant composition according to one or more of the embodiments disclosed herein, the method containing: mixing of the compound of Formula I, for example of Formula IV or Formula V, with the at least one plastic; mixing of the derivative of 9,10-dihydro-9-oxa-10-phosphorylphenanthrene-10-oxide or its polymeric complexes with the at least one plastic. The mixture can likewise exist in compacted or granulated form in order to enable dust-free working during processing.

According to an embodiment, the method further contains; (i) providing the flame retardant composition according to Claim 1; (ii) then mixing of the flame retardant composition with the at least one plastic. In this manner, the flame retardant composition according to embodiments of the subject-matters disclosed herein can be produced and sold separately from the at least one plastic. By mixing the flame retardant composition with the at least one plastic, a plastic composition according to embodiments of the subject-matters disclosed herein is then formed.

According to an embodiment, the compound of Formula I, for example of Formula IV or Formula V; and the derivative of 9,10-dihydro-9-oxa-10-phosphorylphenanthrene-10-oxide or its polymeric complexes are separately fed to the at least one plastic. In this manner, the flame retardant composition according to the invention is realised firstly in the plastic composition produced with this method.

According to an embodiment, the method (according to one or more of the embodiments disclosed herein) further comprises a homogenising of the plastic composition, for example a homogenising in the plastic melt.

For example the flame retardant can be incorporated into the (at least one) plastic by methods of plastics processing which are known to the person skilled in the art, wherein the plastic is fused in the presence of the flame retardant and if applicable the other additives and supplements, and the plastic composition is homogenised. The fusing process usefully takes place above the glass transition temperature, preferably at least 50° C. above the glass transition temperature in the case of amorphous polymers or above the melting temperature, preferably at least 20° C. above the melting temperature in the case of (partially) crystalline plastics. This preferably takes place through extrusion, e.g. on a twin-screw extruder.

Hereafter, exemplary embodiments of the subject-matters disclosed herein are described, wherein reference is made to a method of producing a plastic composition and to a flame retardant composition, for example. It should be emphasised that of course any combination of features of different aspects, embodiments and examples is possible. In particular, some embodiments are described with reference to a method, whilst other embodiments are described with reference to a flame retardant composition. On the other hand, other embodiments are described with reference to a plastic composition.

However, the person skilled in the art shall infer from the above and following description and the claims that, unless otherwise specified, features of different aspects, embodiments and examples can be combined as desired. For example, even a feature which relates to a method can be combined with a feature which relates to a flame retardant composition or a plastic composition. In place of a single plastic, according to one embodiment it is also possible for two or more plastics to be used.

Further advantages and features of the present invention will emerge from the following exemplary description of currently preferred embodiments, to which the invention is however not restricted.

EXECUTION EXAMPLES

The examples according to the invention and comparative examples contained in the table below were processed according to the specified composition with 25 wt % of glass fibres as reinforcing material and respectively processed with the addition of 0.2 wt % Irganox 1098 (phenolic antioxidant, manufactured by BASF SE) and 0.2 wt % Irgafos 168 (phosphite, manufactured by BASF SE) for stabilisation and 0.2 wt % calcium stearate as acid scavenger/lubricant.

The flame retardants FSM-1, FSM-2 and FSM-3 used by way of example (above group (B), i.e. the phosphoric triazine compound according to Formula I used by way of example) are compounds which have been synthesised in accordance with the instructions of DE102007036465A1. DOPO-Zn (above group (C), i.e. the derivative, which is used by way of example, of 9,10-dihydro-9-oxa-10-phosphorylphenanthrene-10-oxide or its polymeric complex) has been produced according to EP 1657972. The flame retardants are the following compounds:

FSM-1: melamine-poly(aluminium phosphate) e.g. $(Mel-H)_2^{(+)} [AlP_3O_{10}]^{2(-)}$
FSM-2: melamine-poly(zinc phosphate) e.g. $[(Mel-H)^+]_2 [ZnP_2O_7]^{2-}$
FSM-3: melamine-poly(magnesium phosphate) e.g. $(Mel-H)_2^{(+)} [Mg_2P_4O_{13}]^{2(-)}$
DOPO-Zn: bis(2'-hydroxybiphenyl-2-phosphinato)-zinc Polyamide (PA) 6.6 was used as plastic in the execution examples specified below. The processing of the PA 6.6 (Durethan A30S, producer: Lanxess) with the specified flame retardants, glass fibres and additives took place in a co-rotating 27 mm Leistritz twin-screw extruder with the 44D screw length, side feeder, vacuum venting and 3 mm twin-hole die. Polyamide pellets and the additive mixture which had been previously produced and homogenised in the paddle mixer were poured in directly at the feed end. The addition of the glass fibres took place via the side feeder. The mixture was processed at a melt temperature of 280° C. and a rotational speed of 300 rpm. The thus produced plastic strands were cooled in the water bath to around 40° C. and then strand-pelletised. The pellets produced were dried at 85° C. for 12 h in the hot-air drier before injection moulding.

Test specimens in accordance with DIN EN 60695-11-10 were produced with a thickness of 1.6 mm via injection moulding methods. A Klöckner Ferromatik Desma FX 75-2F with a processing temperature of 290° C. was used for this.

The combustibility of the test specimens produced was tested in accordance with DIN EN 60695-11-10. To do this, the rod-shaped test specimen is vertically clamped and exposed to a 50 W flame at the lower end twice for a duration of 10 s. The after-flame times of five identical test specimens were determined and a classification was carried out in accordance with the Standard.

| Example | Composition Flame retardant | Processing behaviour | Classification according to DIN EN 60695-11-10 |
|---|---|---|---|
| Comparative example 1 | 25 wt % FSM-1 | − | n.d. |
| Comparative example 2 | 25 wt % FSM-2 | − | n.d. |
| Comparative Example 3 | 25 wt % DOPO-Zn | + | n.d. |
| Comparative Example 4 | 25 wt % FSM-3 | − | n.d. |
| Example 1 according to the invention | 15 wt % FSM-1 10 wt % DOPO-Zn | ++ | V-0 |
| Example 2 according to the invention | 12.5 wt % FSM-2 12.5 wt % DOPO-Zn | ++ | V-0 |
| Example 3 according to the invention | 16.7 wt % FSM-3 8.3 wt % DOPO-Zn | ++ | V-0 |
| Example 4 according to the invention | 11.25 wt % FSM-1 11.25 wt % DOPO-Zn | ++ | V-0 |
| Example 5 according to the invention | 11.25 wt % FSM-2 11.25 wt % DOPO-Zn | ++ | V-0 | n.d. = no classification achieved
Processing behaviour:
++ very good homogeneous smooth strand,
+ good homogeneous strand with few imperfections,
− strand with imperfections, frequent breaks in the strand In contrast to the comparative examples, which each contain 25 wt % of the individual components (B) or (C) and in which no classification of fire proofing is obtained, the classification V-0, and thus a clear synergistic effect, is obtained with the compositions according to the invention. Furthermore, the examples according to the invention are distinguished by very low corrosion on processing machines, i.e. there is a requirement for no or only low amounts of additives which reduce or prevent a corrosion of the processing machines for the plastic composition according to the invention.

Furthermore, the compositions according to the invention have an advantageous processing behaviour.

Similarly to the examples 1-3 according to the invention, tests were carried out with the compositions according to the invention in a partially aromatic polyamide 6/6T (Ultramid T KR 4350, producer: BASF SE) with 25% glass fibres and the specified compositions. The extrusion takes place at a maximum temperature of 310° C., and the production of the test specimens takes place at a temperature of 315° C. In contrast to the comparative examples, a classification according to V-0 is also achieved with the compositions according to the invention.

| Example | Composition Flame retardant | Classification according to DIN EN 60695-11-10 |
|---|---|---|
| Comparative Example 5 | 25 wt % FSM-3 | n.d. |
| Comparative Example 6 | 25 wt % DOPO-Zn | n.d. |
| Example 6 according to the invention | 15 wt % FSM-3 10 wt % DOPO-Zn | V-0 |

-continued

| Example | Composition Flame retardant | Classification according to DIN EN 60695-11-10 |
|---|---|---|
| Example 7 according to the invention | 12.5 wt % FSM-3 12.5 wt % DOPO-Zn | V-0 |

According to embodiments of the subject-matters disclosed herein, a flame retardant composition for plastics and in particular for polyamides is suggested which in terms of the effect, processing behaviour and the cost-performance ratio represents an attractive alternative to compositions currently known and used. Due to the low corrosion with the flame retardant composition disclosed herein, it is also possible to make savings in, or reduce the amount of, corrosion-inhibiting additives.

Embodiments of the subject-matters disclosed herein supply flame-retarded plastic compositions, for example based on polyamide. Such plastic compositions have applications, for example, in the form of injection moulded parts, films, coatings, foams, fibres, cables and pipes in the electrical/electronic industry, in transport and construction, in the packaging industry, in household appliances; consumer articles, furniture and textile applications. In particular, according to an embodiment, the flame-retarded composition can be used in the form of coatings. For example, any suitable workpieces can be flame-retarded by coating with a plastic composition according to embodiments of the subject-matters disclosed herein.

It should be pointed out that the embodiments described here depict only a limited selection of possible design variants of the invention. It is thus possible to combine the features of individual embodiments in a suitable manner so that for the person skilled in the art, a plurality of different embodiments should be regarded as obviously disclosed with the explicit design variants here. It should also be mentioned that the use of the singular, for example by terms such as "a" or "of a" does not rule out a plural. For example, the reference to "a" plastic or "the plastic" does not rule out that two or more plastics can be used in place of the one plastic. For example, the detail "mixing of the flame retardant composition with a plastic" does not rule out that the flame retardant composition is mixed with two or more plastics, for example all plastics contained in the plastic composition produced with the method. Terms such as "containing" or "comprising" do not rule out further features or process steps. Furthermore, the term "contain" or "contains" used herein encompasses in particular the term "comprise" (alongside additional components) and the term "consist of". Within the framework of the subject-matters disclosed herein, both meanings ("comprise" and "consist of") should be deemed to be disclosed by "contain".

Furthermore, within the framework of this application, the term "according to the invention" means "according to embodiments of the subject-matters disclosed herein". In particular, the invention is not limited to the embodiments and examples labelled "according to the invention"; on the contrary, the reference to the invention specifies merely that these embodiments and examples fall within the scope of the invention.

In summary, the following should be stated:

A description is given of a flame retardant composition, containing a compound of Formula I:

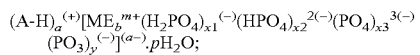

and a derivative of 9,10-dihydro-9-oxa-10-phosphoryl-phenanthrene-10-oxide or polymeric complexes of this derivative, according to at least one of the Formulae IIa, IIb, IIc and IId:

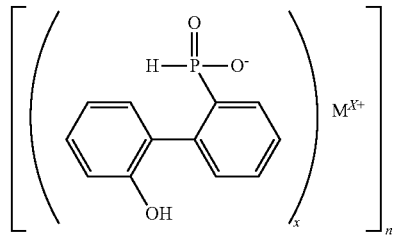

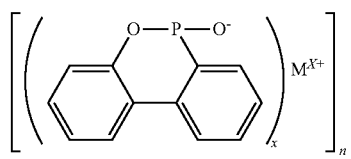

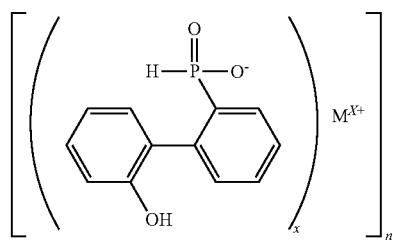

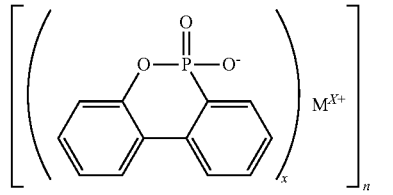

wherein each ME is independently one of Cu, Mg, Ca, Zn, Mn, Fe, Co, Ni, TiO, ZrO, VO, B, Si, Al, Sb, La, Ti, Zr, Ce or Sn and each M is independently one of a metal of the second, third, twelfth or thirteenth group of the periodic system; wherein x=2 or 3; and wherein n≥1; wherein $(A-H)^{(+)}$ is a residue of Formula III;

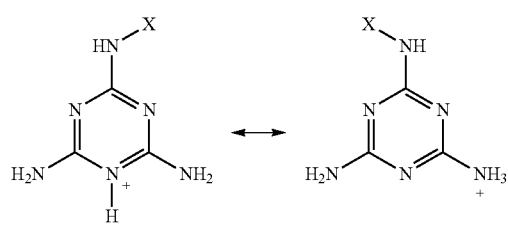

wherein X is one of H, CN, $C(NH)NH_2$, $C(O)NH_2$, C(NH)NHCN, or a condensation product of one or more of H, CN, $C(NH)NH_2$, $C(O)NH_2$, C(NH)NHCN; wherein m is an integer in the interval [1, 4]; wherein a is an integer in the interval [1, 6]; wherein b is an integer in the interval [1, 14]; wherein each of x1, x2, x3, y is an integer in the interval [0, 12], wherein at least one of x1, x2, x3, y is greater than zero (>0); wherein p is an integer in the interval [0, 5]; and wherein the following applies: a+m b=x1+2 x2+3 x3+y. According to an embodiment, x2=1 and x1=x3=y=0. Furthermore, according to an embodiment a=m and b=1, wherein m can be 2 or 3 for example. The flame retardant composition is suitable in particular for providing flame retardancy to plastics, for example polyamides.

In particular, a flame retardant composition is described, containing a compound of Formula I:

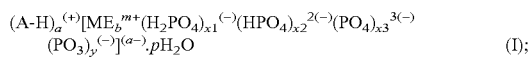
(I);

and a derivative of 9,10-dihydro-9-oxa-10-phosphorylphenanthrene-10-oxide or polymeric complexes of this derivative, wherein each ME is independently one of Cu, Mg, Ca, Zn, Mn, Fe, Co, Ni, TiO, ZrO, VO, B, Si, Al, Sb, La, Ti, Zr, Ce or Sn and $(A-H)^{(+)}$ is melamine, melam or melem, for example. According to an embodiment, x2=1 and x1=x3=y=0. Furthermore, according to an embodiment a=m and b=1, wherein m can be 2 or 3 for example. The flame retardant composition is suitable in particular for providing flame retardancy to plastics, for example polyamides.

The invention claimed is:

1. A flame retardant composition comprising a compound of Formula I:

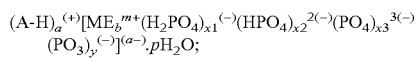

wherein each ME is independently one of Cu, Mg, Ca, Zn, Mn, Fe, Co, Ni, TiO, ZrO, VO, B, Si, Al, Sb, Ti, Zr, or Sn;
wherein $(A-H)^{(+)}$ is a residue of Formula III;

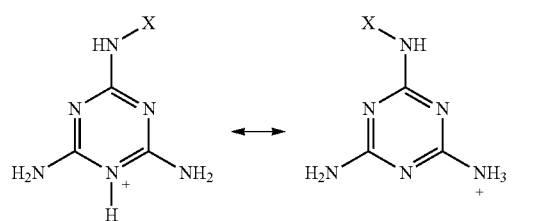
(III)

wherein X is one of H, CN, $C(NH)NH_2$, $C(O)NH_2$, C(NH)NHCN, or a condensation product of one or more of H, CN, $C(NH)NH_2$, $C(O)NH_2$, or C(NH)NHCN;
wherein m is an integer in the interval [1, 4];
wherein a is an integer in the interval [1, 6];
wherein b is an integer in the interval [1, 14];
wherein each of x1, x2, x3, and y is independently an integer in the interval [0, 12],
wherein at least one of x1, x2, x3, and y is >0;
wherein p is an integer in the interval [0, 5]; and
wherein the following applies: a+m b=x1+2 x2+3 x3+y; and
a derivative of 9,10-dihydro-9-oxa-10-phosphorylphenanthrene-10-oxide or polymeric complexes of this derivative, according to at least one of the Formulae IIa, IIb, IIc, and IId:

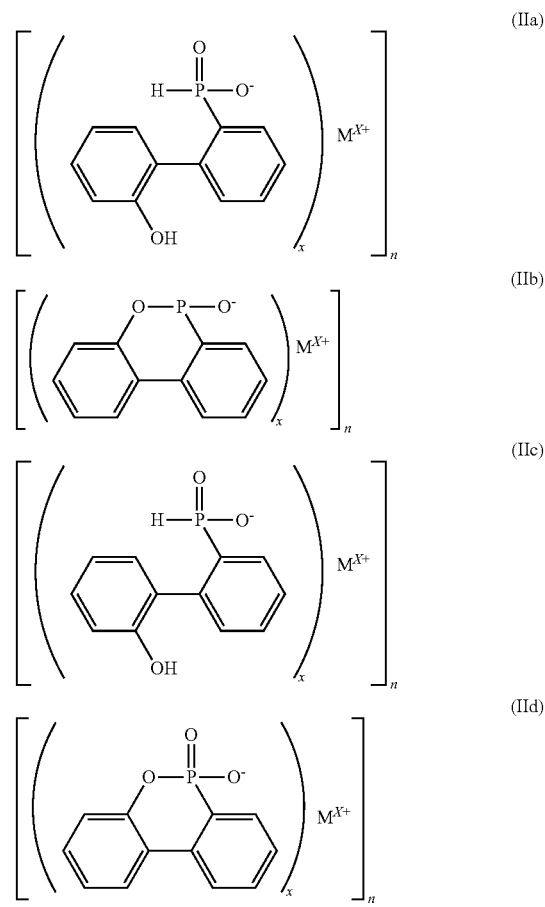

wherein each M is independently one of a metal of the second, twelfth, or thirteenth group of the periodic system;
wherein x=2 or 3;
wherein n≥1; and
wherein the weight ratio between the compound of Formula I and the derivative of 9,10-dihydro-9-oxa-10-phosphorylphenanthrene-10-oxide or the polymeric complexes of the derivative is between about 1:10 and about 10:1.

2. The flame retardant composition according to claim 1, wherein the compound of Formula I comprises at least one of the following compounds or consists of at least one of the following compounds:

melamine (aluminium phosphate) $(Mel-H)_2^{(+)}$ $[AlP_3O_{10}]^{2(-)}$;
melamine (zinc phosphate) $[(Mel-H)^+]_2$ $[ZnP_2O_7]^{2-}$;
melamine (magnesium phosphate) $(Mel-H)_x^+$ $[Mg^{2+}]_2$ $[PO_3^-]_{(x+1)}$ $[PO_4^{3-}]$,
wherein x is between 1 and 4, in particular $(Mel-H)_2^{(+)}$ $[Mg_2P_4O_{13}]^{2(-)}$;
or oligomers or polymers thereof.

3. The flame retardant composition according to claim 1, further comprising at least one additional flame retardant which is different from the compound of Formula I and which is different from the derivative of 9,10-dihydro-9-oxa-10-phosphorylphenanthrene-10-oxide or its polymeric complex.

4. The flame retardant composition according to claim 1, wherein Formula I is a compound of Formula IV or Formula V, wherein Formula IV is $[(A-H)^+]_a$ $[ME_b^{m+} (H_2PO_4^-)_x (HPO_4^{2-})_y]$ with a+b*m=x+2*y; and wherein Formula V is $[(A-H)^+]_a$ $[ME_b^{m+} (PO_4^{3-})_x (PO_3^-)_y]$ with a+b*m=3*x+y.

5. The flame retardant composition according to claim 4, wherein Formula IV is
$[(A-H)^+]_a$ $[ME_b^{m+}(HPO_4^{2-})_m]$ or Formula V is $[(A-H)^+]_a$ $[ME_b^{m+}(P_2O_7^{4-})_{m/2}]$.

6. The flame retardant composition according to claim 4, wherein a=m or b=1.

7. A plastic composition comprising at least one plastic and a flame retardant composition according to claim 1, wherein the plastic is a thermoplastic plastic, an elastomeric plastic, or a thermosetting plastic.

8. The plastic composition according to claim 7, further comprising a reinforcing material and/or a filler material.

9. The plastic composition according to claim 7, further comprising one or more acid scavengers, one or more stabilisers, and/or one or more dispersing agents.

10. The plastic composition according to claim 7, the plastic composition comprising a basic component consisting of:
    (A) 40-95 wt % of the at least one plastic;
    (B) 1-30 wt % of the phosphoric triazine compound according to Formula I;
    (C) 1-30 wt % of the derivative of 9,10-dihydro-9-oxa-10-phosphorylphenanthrene-10-oxide or its polymeric complex;
    (D) 0-20 wt % additional flame retardant (one or more flame retardants, which are different from (B) and (C));
    (E) 0-40 wt % reinforcing material and/or filler material;
    so that the ingredients (A) to (E) in total add up to 100 wt %; and
optionally at least one additional component.

11. The plastic composition according to claim 7, the plastic composition comprising a basic component consisting of:
    (A) 40-95 wt % of the at least one plastic;
    (B) 2-20 wt % of the phosphoric triazine compound according to Formula I;
    (C) 2-20 wt % of the derivative of 9,10-dihydro-9-oxa-10-phosphorylphenanthrene-10-oxide or its polymeric complex;
    (D) 0-20 wt % additional flame retardant (one or more flame retardants, which are different from (B) and (C));
    (E) 0-40 wt % reinforcing material and/or filler material;
    so that the ingredients (A) to (E) in total add up to 100 wt %; and
optionally at least one additional component.

12. The plastic composition according to claim 7, wherein one of the at least one plastic is a polyamide or comprises a polyamide.

13. The plastic composition according to claim 12, wherein the polyamide is an aromatic polyamide or is a partially aromatic polyamide.

14. A method of producing a plastic composition, which comprises at least one plastic and a flame retardant composition according to claim 1, the method comprising:
    mixing of the compound of Formula I with the at least one plastic;
    mixing of the derivative of 9,10-dihydro-9-oxa-10-phosphorylphenanthrene-10-oxide or its polymeric complexes with the at least one plastic.

15. The method according to claim 14, further comprising:
    providing the flame retardant composition according to claim 1;

thereafter mixing the flame retardant composition with the at least one plastic.

16. The method according to claim 14, wherein the compound of Formula I and the derivative of 9,10-dihydro-9-oxa-10-phosphorylphenanthrene-10-oxide or its polymeric complexes are separately fed to the at least one plastic.

17. The method according to claim 14, further comprising:
    homogenising the mixture made up of the at least one plastic and the flame retardant composition in the plastic melt.

18. The method according to claim 14, wherein the plastic composition is a flame-retarded plastic composition.

19. A flame retardant composition comprising a compound of Formula I:

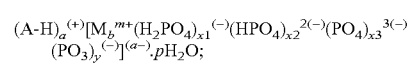

wherein each ME is independently one of Cu, Mg, Ca, Zn, Mn, Fe, Co, Ni, TiO, ZrO, VO, B, Si, Al, Sb, Ti, Zr, or Sn;

wherein $(A-H)^{(+)}$ is a residue of Formula III;

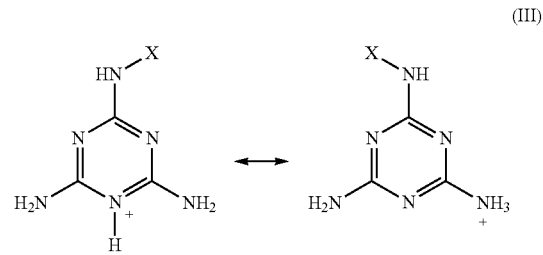

wherein X is one of H, CN, $C(NH)NH_2$, $C(O)NH_2$, C(NH)NHCN, or a condensation product of one or more of H, CN, $C(NH)NH_2$, $C(O)NH_2$, or C(NH)NHCN;

wherein m is an integer in the interval [1, 4];

wherein a is an integer in the interval [1, 6];

wherein b is an integer in the interval [1, 14];

wherein each of x1, x2, x3, and y is independently an integer in the interval [0, 12], wherein at least one of x1, x2, x3, and y is >0;

wherein p is an integer in the interval [0, 5];

wherein the following applies: a+m b=x1+2 x2+3 x3+y; and a derivative of 9,10-dihydro-9-oxa-10-phosphorylphenanthrene-10-oxide or polymeric complexes of this derivative, according to at least one of the Formulae IIa, IIb, IIc and IId:

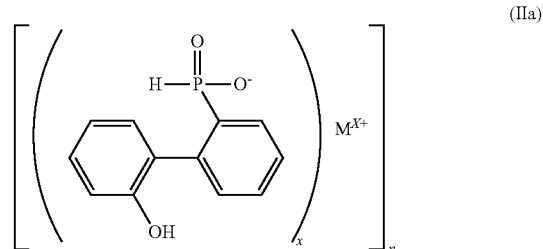

-continued (IIb)
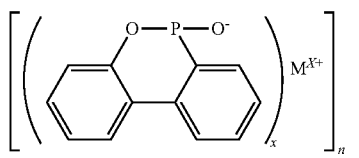

(IIc)
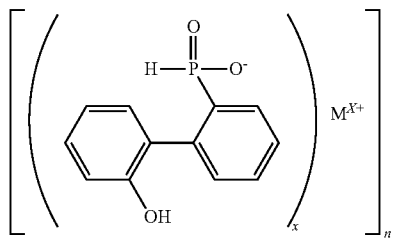

(IId)
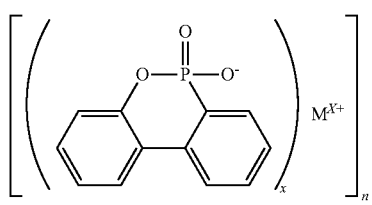

wherein each M is independently one of a metal of the second, twelfth, or thirteenth group of the periodic system;

wherein x=2 or 3;

wherein n≥1;

wherein the compound of Formula I comprises at least one of the following compounds or consists of at least one of the following compounds:

melamine (aluminium phosphate) $(Mel-H)_2^{(+)}$ $[AlP_3O_{10}]^{2(-)}$;

melamine (zinc phosphate) $[(Mel-H)^+]_2$ $[ZnP_2O_7]^{2-}$;

melamine (magnesium phosphate) $(Mel-H)_x^+$ $[Mg^{2+}]_2$ $[PO_3^-]_{(x+1)}$ $[PO_4^{3-}]$, wherein x is between 1 and 4;

or oligomers or polymers thereof, wherein the weight ratio between the compound of Formula I and the derivative of 9,10-dihydro-9-oxa-10-phosphorylphenanthrene-10-oxide or its polymeric complex is between 1:30 and 30:1.

* * * * *